RUDOLPH J. NOVOTNY
RICHARD C. SCHUBERT
INVENTORS

ATTORNEYS

March 24, 1964     R. J. NOVOTNY ETAL     3,126,078
SPEED CONTROL AND REMINDER MECHANISM
Filed Jan. 17, 1962            3 Sheets-Sheet 2
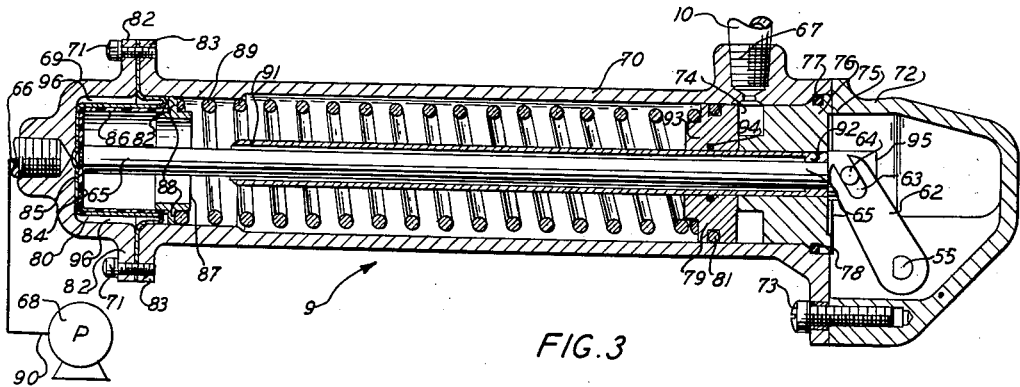
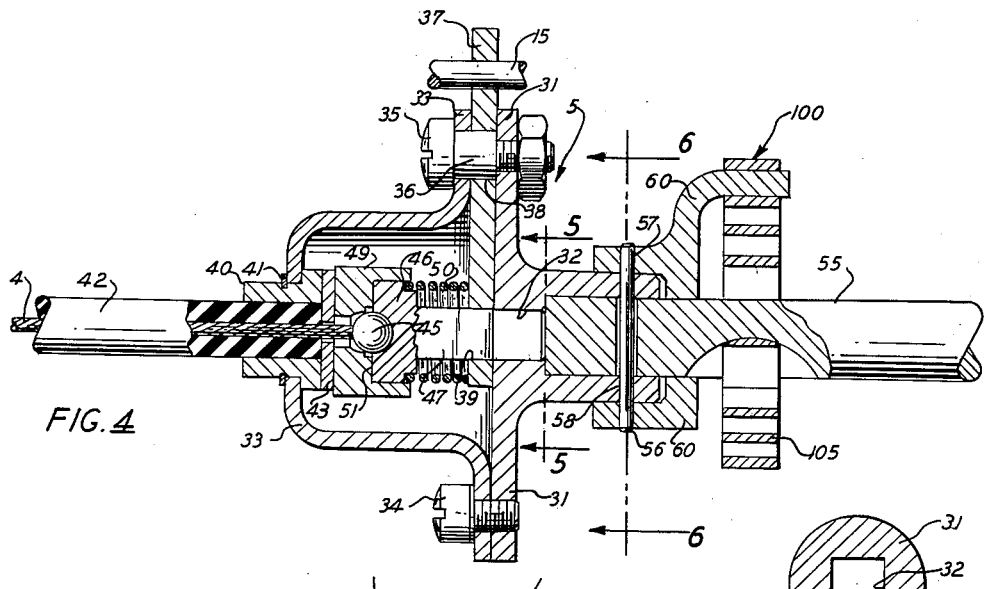
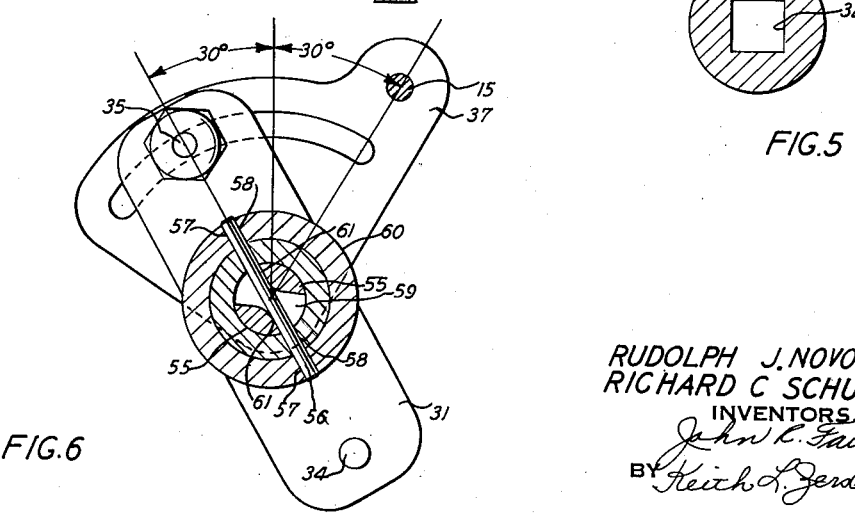
RUDOLPH J. NOVOTNY
RICHARD C. SCHUBERT
INVENTORS
BY
ATTORNEYS March 24, 1964 R. J. NOVOTNY ETAL 3,126,078
SPEED CONTROL AND REMINDER MECHANISM
Filed Jan. 17, 1962 3 Sheets-Sheet 3

RUDOLPH J. NOVOTNY
RICHARD C. SCHUBERT
INVENTORS

BY

ATTORNEYS

United States Patent Office 3,126,078
Patented Mar. 24, 1964

3,126,078
SPEED CONTROL AND REMINDER MECHANISM
Rudolph J. Novotny, New Boston, and Richard C. Schubert, Inkster, Mich., assignors to Ford Motor Company, Dearborn, Mich., a corporation of Delaware
Filed Jan. 17, 1962, Ser. No. 166,858
11 Claims. (Cl. 192—3)

This invention relates to an automatic control system. More specifically, this invention relates to an automatic speed control and warning system for an automotive vehicle.

The invention, hereinafter described in detail, is an automatic speed control and warning system for an automotive vehicle utilizing an automatic control means. The automatic control means functions to maintain an automotive vehicle at a selected speed.

In utilizing the invention, the operator of the automotive vehicle selects a speed and depresses the accelerator pedal until a signal is manifested by the automatic speed control and warning system. The signal reminds the operator that the selected speed has been attained. The operator may then actuate an engagement device. The actuation of the engagement device by the operator places the automobile accelerator linkage under the control of the automatic control means, whereby the operator may remove his foot from the accelerator pedal. The automobile will be maintained at a substantially constant speed over reasonable terrain while the automatic control means is in engagement.

The automatic control and warning system does not prevent the operator from depressing the accelerator pedal so that the automotive vehicle may exceed the selected speed. When the operator causes such a depression of the accelerator pedal, a slight additional force is exerted by the system in opposite to the further actuation of the accelerator linkage, thus warning the operator when the selected speed has been exceeded. The system can be disengaged by depressing a brake pedal or by actuating the engagement device.

It should be understood that, while the automatic control and warning system is described in the environment of an automotive vehicle, it is within the broad scope of the invention to apply it to other types of vehicles and machines.

The particular construction of the automatic control and warning system, hereinafter described in detail, has the advantages of being simple in construction and inexpensive to manufacture.

The general object of the invention is the provision of an automatic control system.

Another object of the invention is the provision of a speed control and warning system for an automotive vehicle that is capable of automatically maintaining the automotive vehicle at a selected speed over all reasonable terrain.

A further object of the invention is the provision of a speed control mechanism for an automotive vehicle that is capable of automatically maintaining the vehicle at a selected speed and is also capable of warning the operator when this speed has been attained and is being exceeded.

Other objects and advantages of the present invention will become more readily apparent as the specification is considered in connection with the attached drawings, in which:

FIGURE 3 is a sectional view taken along line 3—3 of FIGURE 2;

FIGURE 4 is a sectional view of the comparing means and warning means;

FIGURE 5 is a sectional view taken along line 5—5 of FIGURE 4;

FIGURES 6 through 9 are end views in partial section taken along line 6—6 of FIGURE 4 showing different positions of the rotatable elements of the automatic control and warning system; and, FIGURE 10 is a schematic force diagram of the automatic control means.

Figures 1, 2:
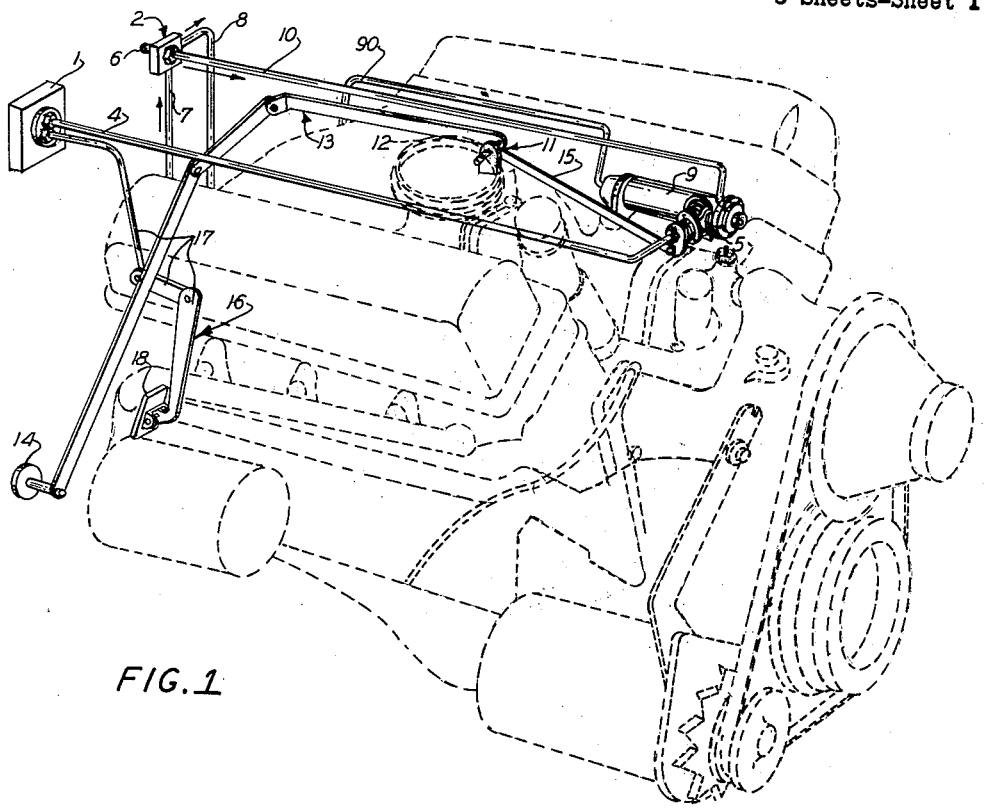
FIGURE 1 is a schematic perspective drawing of the speed control and warning system mounted on the automotive vehicle.
FIGURE 2 is a simplified front view of the automatic control means, warning means and comparing means.

Referring to FIGURE 1, the automatic control and warning system may include an engagement device or a selection means 1 and an input means 2 placed on the dashboard of the automotive vehicle. The selection means includes a manual actuating device (not shown). The manual actuating device may be any manual control having an operative and an inoperative position. The manual actuating device is connected to a push-pull cable 4 which is, in turn, connected to a comparing means 5. The movement of the manual actuating device from an operative to an inoperative position by the operator will actuate the comparing means 5.

A brake means 16 is connected to the selection means 1 (FIGURE 1). The brake means 16 includes a brake linkage 17 and a pedal 18 rigidly attached to one end of the brake linkage 17. The other end of the brake linkage 17 is attached to the push-pull cable 4 of the selection means 1. The brake linkage 17 is a pivotally mounted so that the depression of the brake pedal 18 will cause a force to be exerted on the push-pull cable 4. The force exerted on the push-pull cable 4 by the depression of the brake pedal 18 is in a direction which is opposite to the direction of the force exerted on the push-pull cable 4 when the operator depresses the manual actuating device of the selection means 1 to actuate the comparing means 5.

In operation, the depression of the brake pedal 18 will exert to force upon the comparing means 5 which will tend to disengage the automatic control means 9 while the depression of the manual actuating device (not shown) of the selection means 1 will exert a force upon the comparing means which will tend to engage the automatic control means 9.

The input means 2 is connected to a high pressure oil supply (not shown) by the tubing 7. When the automatic control and warning system is employed in an automotive vehicle, the high pressure supply means may be the oil pump which is utilized in the transmission system of the vehicle. The input means 2 is also connected to a sump (not shown) by the tubing 8. The sump may be the sump that is utilized in the transmission system of the automotive vehicle. The input means 2 is connected to the automatic control means 9 by the tubing 10. The tubing 10 transmits a pressure from the high pressure supply to the automatic control means 9.

The input means 2 includes a manual speed selector 6. The manual speed selector 6 may be a manually adjustable four-way valve which has been calibrated, so that a particular setting of the valve will cause a pressure proportional to a desired vehicle speed. This type of valve is well known in the art.

In operation, the manual speed selector 6 is adjusted and a fluid flows from the high pressure supply means through the tubing 7 to the automatic control means 9 and through the tubing 8 to the sump. The fluid does not flow through the automatic control means 9, but rather causes a substantially static pressure to exist therein. It should be readily apparent from the foregoing description that the input means 2 is utilized to supply a pressure proportional to a selected speed to the automatic control means 9.

Referring to FIGURE 1, the automatic control and warning system is connected to the controllable means 11. When the automatic control and warning system is utilized in an automotive vehicle, the controllable means 11 may include a carburetor 12 which is connected to an accelerator linkage 13. The accelerator linkage 13 has an accelerator pedal 14 and is connected to the comparing means 5 by a coupling means or link 15. The accelerator linkage 13, the accelerator pedal 14 and the link 15 are so connected that actuation of the accelerator pedal 14 will cause the link 15 to transmit a signal to the comparing means or more particularly to rotate an element of the comparing means 5.

Comparing means 5 is generally shown in FIGURES 1 and 2 and more specifically shown in FIGURES 4, 5 and 6. Referring to FIGURES 4, 5 and 6, the comparing means 5 has a movable means or more particularly a rotatable element 31. The rotatable element 31 has a square hole 32 (FIGURE 5).

A housing 33 is rigidly connected to the rotatable element 31 by the fastening means 34 and 35. The fastening means 34 may be an ordinary screw which threadedly engages the housing 33 and the rotatable element 31, thereby securing housing 33 to the rotatable element 31.

The fastening means 35 may be an ordinary nut and bolt having a sleeve 36 which abuts the head of the bolt and the surface of the rotatable element 31. The sleeve 36 provides a separation between the housing 33 and the rotatable element 31. The separation between the housing 33 and the rotatable element 31 permits a movable member or more particularly a rotatable element 37 to rotate freely between the housing 33 and the rotatable element 31. The sleeve 36 also provides a bearing surface for an arcuate slot 38 in the rotatable element 37 (FIGURE 5), thus partially supporting the rotatable element 37.

The rotatable element 37 has a square hole 39 which has its axis coincidental with the axis of the square hole 32 in the rotatable element 31. The rotatable element 37 is rotated about the axis of the square hole 39 by the link 15 connected to the accelerator linkage 13.

The housing 33 includes a sleeve member 40 which is secured to the housing 33 by a lock washer 41. The sleeve member 40 supports the external sheath 42 of the push-pull cable 4. A guide washer 43 is secured to the sleeve member 40 and guides the push-pull cable 4 and the ball member 45, which is rigidly attached to the push-pull cable 4, into engagement with a bolt member 46. The bolt member 46 has a square shank 47 which extends into square hole 39 of rotatable element 37. The rotatable element 37, which is rotated by the accelerator linkage 15, may thereby rotate about the axis of the square hole 39.

In operation, the rotation of the rotatable element 37 will cause the bolt member 46 to rotate about the ball member 45. The square shank 47 of the bolt member 46 rotates with the rotatable element 37 and independent of the rotatable element 31. It is apparent that the square shank 47 may only move into the square hole 32 in the rotatable element 31 when there is a proper alignment of the square shank 47 and the square hole 32.

The bolt member 46 is supported for rotary and sliding movement by cylindrical support member 49. The cylindrical support member 49 is rigidly attached to the guide washer 43. A resilient member 50 is secured between the rotatable element 37 and the bolt member 46. The resilient member 50 urges the surface 51 of bolt member 46 into contact with the cylindrical support member 49. It should be noted that surface 51 of the bolt member 46 is normally in contact with the cylindrical support member 49 causing the rotatable element 37 and bolt member 46 to remain independent of the rotatable element 31. The actuation of the manual actuating device of the selection means 1 will cause a force to be exerted upon the bolt member 46 by the push-pull cable 4, thereby tending to move the bolt member 46 against the force of the resilient member 50 and into engagement with the square hole 32.

It is obvious from the foregoing detailed description that the rotatable element 37 may rotate independent of the rotatable element 31, or the rotatable element 37 may be engaged by the actuation of the selection means 1 to rotate as a unit with the rotatable element 31. It should be understood that the rotatable elements 31 and 37 can only be engaged to rotate as a unit when the square hole 32 is rotated so that it may receive the square shank 47 of the bolt member 46.

In operation, assuming the proper alignment of the square shank 47 and the square hole 32, the rotatable element 37 may be engaged to rotate with the rotatable element 31 by actuating the bolt member 46 to slide longitudinally into engagement with the square hole 32 by depressing the manually actuating device of the selection means 1 (FIGURE 1). The depression of the brake pedal 18 (FIGURE 1) will exert a force, as heretofore described, which will disengage the bolt member 46 from the rotatable element 31, thereby enabling independent rotation of the rotatable element 37 and the associated accelerator linkage 15 connected thereto.

The rotatable element 31 is rotated by a shaft 55 of the automatic control means 9. The shaft 55 is connected to the rotatable element 31 by the spring 105 and the pin 56 which passes through hole 57 in arm 60, a hole 58 in the rotatable element 31 and a 60° slot 59 in the shaft 55 (FIGURE 6). The spring 105 has one end secured to the arm 60 and one end fastened to the shaft 55 and is hereinafter described in conjunction with the warning means. The clockwise rotation of the shaft 55 (FIGURE 6) will cause the spring 105 to rotate the arm 60 which, in turn, will rotate the pin 56 and the rotatable element 31. The counterclockwise rotation of the shaft 55 causes the shoulder 61 to rotate the pin 56 and the rotatable element 31.

A link 62 (FIGURE 3) is rigidly fixed to the shaft 55. The link 62 has a slot 63 which is in sliding engagement with pin 64 which is fixed to an output shaft 65 of the automatic control means 9. The link 62 and the pin-slot connection 63 and 64 cooperate to transform the longitudinal movement of output shaft 65 to rotational movement at the shaft 55.

The comparing means or more particularly the rotatable elements 31 and 37 function to compare the signals or rotation transmitted by the link 62 and shaft 55 of the automatic control means and the accelerator linkage 13, only permitting the shaft 55 and the accelerator linkage 13 to be engaged to rotate as a unit when the signals or rotation transmitted cause equal displacement from a selected reference line. It is now necessary to consider the detail construction and the nature of the signal caused by automatic control means.

The automatic control means or more particularly spring balance means 9 has two input ports 66 and 67. The input ports 66 and 67 are connected to two input means. One of the input means heretofore described is the input means 2 (FIGURE 1). The input means 2 supplies an input signal to input port 67 which is proportional to a selected value of the variable being controlled. In applying the invention to an automotive vehicle, the input means 2 supplies an input signal proportional to the selected speed that the operator desires the automotive vehicle to maintain. The operator controls the selected speed by actuating the manual speed selector 6 of the input means 2.

Another input means 68 is connected to the input port 66 by the tubing 90 (FIGURE 1). The input means 68 supplies a signal proportional to the actual value of the variable to be controlled. In the case of the automotive vehicle, the input means 68 supplies a signal which is proportional to the actual speed of the automotive vehicle. The input means 68 may be a pump driven by the automotive vehicle transmission to supply an input signal proportional to the actual speed of the automotive vehicle. It should be understood that it is within the scope of the invention to utilize the oil pump of the automotive vehicle to serve as the input means or to utilize other well-known mechanical or electrical input means that can be connected to the automotive vehicle to supply a signal proportional to the actual speed.

Referring to FIGURE 3, the input ports 66 and 67 are placed in the end cap 69 and the cylinder body 70, respectively. The end cap 69 is fastened to the left end of the cylinder body 70 by the fastening means 71. The cylinder body 70 also has an end cap 72 fastened to its right end by the fastening means 73. The end caps 69 and 72 and the cylinder body 70 form a fluid-tight chamber.

The end cap 72 has a shoulder 75 which abuts the support member 76. An O-ring 78 is placed in a groove 77 in the support member 76. The cylinder body 70, the O-ring 78 and the end cap 72 cooperate to secure the support member 76 and to prevent any possible leakage around the support member 76.

The cylinder body 70 has two movable members 79 and 80 disposed therein to be actuated by the input signals communicated to the ports 66 and 67. In the preferred embodiment, the movable member 79 is a piston having an O-ring 81 which prevents leakage. The piston 79 abuts the support member 76 when there is no input signal being commuicated to input port 67 and forms a fluid-tight chamber 74, whereby a signal communicated to the input port 67 may cause the piston 79 to move.

In the preferred embodiment the movable element 80 is a rolling diaphragm type element 80 which is fastened between the flanges 82 and 83 by the fastening means 71 circumferentially spaced around the flanges 82 and 83. The movable element 80 may be a piston, but it has been found that where relatively small movement is contemplated the diaphragm type of element can be used, thereby minimizing friction and leakage.

The diaphragm element 80 has an internal portion 84 and an external portion 85. The external portion 85 cooperates with the end cap 69 to form a fluid-tight chamber 96 which is connected to the input port 66. The internal portion 84 of the diaphragm element 80 has a substantially rigid cup member 86 attached thereto. The application of a pressure signal to the port 66 will cause the diaphragm element 80 to expand. The expansion is controlled, however, by the cup member 86 which causes the expansion to take the form of a rolling of the diaphragm along the cylinder body 70.

The cup member 86 is in contact with a balance member 87 having a peripheral ridge 88 disposed about its circumference. The peripheral ridge 88 is in contact with the cup member 86 and a resilient member 89 which contacts the piston 79. The resilient member 89 in the preferred embodiment is a coil-type steel spring.
The output shaft 65 is attached to the cup member 86 and extends through the balance member 87 and a bearing member 91. The bearing member 91 encompasses the output shaft 65 making contact with the shaft only at the end 92. The output shaft 65 and the bearing member 91 extend through the piston 79 and the support member 76. The bearing member 91 makes sliding contact with the piston 79 and an O-ring 94 positioned therein and is supported and rigidly attached to the support member 76. The bearing member 91 functions to support and to isolate the output shaft 65 from any friction caused by the movement of the piston 79.

The output shaft 65 has the pin 64 attached to it by the fastening means 95. As heretofore described, the pin 64 cooperates with the slot 63 to convert the longitudinal movement of the output shaft 65 to rotary movement at shaft 55. It should further be recalled that shaft 55 is connected to one of the rotatable elements 31 of the comparing means.

In operation, the above-described automatic control means or more particularly the spring balance system 9 receives a signal at port 67 which is proportional to the selected value of the variable being controlled. In the case of an automotive vehicle, the signal is proportional to the selected vehicle speed. This signal is communicated to the chamber 74 formed by the piston 79 and the support member 76 and tends to cause the piston 79 to move in a longitudinal direction along the bearing member 91, thereby tending to compress the resilient member 89.

The compression of the resilient means 89 is proportional to the signal communicated to the port 67. As a result of the compression, the resilient member 89 will cause a force to be exerted on the force balance member 87. This force will be proportional to the signal communicated to port 67. The force exerted on the force balance member 87 is transmitted to the cup member 86 and, in turn, to the movable element 80.

The port 66 has a signal communicated to it proportional to the actual value of the variable being controlled. In the case of the automotive vehicle, the signal is proportional to the actual speed of the automotive vehicle. This signal is connected to the chamber 96 formed by the movable element 80 and the end cap 69. The signal will tend to cause the movable element 80 to move to the right (FIGURE 3), thereby tending to compress the resilient member 89.

The movement of movable element 80 determines the movement of the output shaft 65. The exact nature of the movement of output shaft 65, caused by the movable elements 79 and 80, can be readily understood when considered in conjunction with the schematic force diagram shown in FIGURE 10. The numerical designations in FIGURE 10 indicate the parts of FIGURE 5 which are therein schematically represented. The alphabetical symbols shown in FIGURE 9 and referred to hereinafter are defined as follows:

$P_a$ = A pressure signal, in pounds per square inch, proportional to the actual speed of the automotive vehicle;

$P_s$ = A pressure signal, in pounds per square inch, proportional to the selected speed of the automotive vehicle;

$A_a$ = The area, in square inches, of the movable member 80 that is exposed to the pressure signal $P_a$;

$A_s$ = The area, in square inches, of the movable member 79 that is exposed to the pressure signal $P_s$;

$F_a$ = The force, in pounds, that is a product of $P_a \times A_a$;

$F_s$ = The force, in pounds, that is the product of $P_s \times A_s$;

$K$ = The spring constant for resilient member 89;

$X_s$ = The displacement, in inches, of the movable member 79;

$X_a$ = The displacement, in inches, of the movable member 80.

When a selected speed is chosen, a pressure $P_s$ is caused which, in turn, causes a force $F_s$ to be exerted on the movable member 79. Initially, the pressure $P_a$ applied to movable member 80 and, consequently, the force $F_a$ is considered to be zero. The force $F_s$ under these conditions will cause the movable element 79 to be displaced a distance $X_s$. The distance $X_s$ is equal to the force $F_s$ divided by the spring constant K.

The movement of the movable element 79 causes the spring 89 to be compressed, which, in turn, disregarding frictional losses, causes a force equal to the force $F_s$ to be exerted upon the movable element 80. The force exerted upon the movable element 80 causes the element 80 to abut the end cap 69. If the pressure signal $P_s$ is maintained and if the fluid causing the pressure is considered incompressible, the movable element 79 will, in effect, act as a stop member.

As the vehicle speed increases pressure $P_a$, which is applied to the input port 66, will cause the force $F_a$ to increase. When the force $F_a$ exceeds the force $F_s$, the movable element 80 will move and compress the resilient member 89. The output shaft 65 moves with the movable element 80. The movement of the movable element 80 and the output shaft 65 is thus governed by the equation:

$$X_a = P_a(A_a) - P_s(A_s)$$
$$= F_a - F_s \qquad (1)$$

It should be recalled that the rotatable element 31 is to be engaged to rotate with the rotatable element 37. The rotatable elements 31 and 37 need only be engageable when the actual speed and the selected speed are equal. In order for the rotatable elements 31 and 37 to be so engageable, it is desirable to have the shaft 55 and the rotatable element 31 assume a position proportional to the actual speed, as the rotatable element 37 is rotated through an angle which is proportional to the actual speed by the accelerator linkage 13 and link 15. It should be understood that the rotation of shaft 55 and the rotatable element 31 need only be proportional to the actual speed when the actual speed is equal to the selected speed, that is when signals $P_a$ and $P_s$ are equal.

Referring to Equation 1, in order for output shaft 65 to be displaced a distance $X_a$ proportional to the actual speed, with the pressures $P_a$ and $P_s$ equal, it is necessary that the area $A_a$ should exceed the area $A_s$. When the areas $A_a$ and $A_s$ are unequal and signals $P_a$ and $P_s$ are equal, the force $F_a - F_s = P_a(A_a - A_s)$. Since the value of $A_a - A_s$ is constant, it is obvious that the value of $F_a - F_s$ and the displacement of the output shaft 65 is then proportional to the pressure $P_a$ representative of the actual speed of the automotive vehicle.

It should be understood that for any selected speed the force $F_s$ can be considered constant and the displacement of the output shaft 65 would be proportional to the actual speed of the automotive vehicle. It is apparent from the above description that the output signal or more particularly the movement of the output shaft 65 may be considered proportional to the automotive vehicle speed when the input signals $P_a$ and $P_s$ are equal. Further, the movement of output shaft 65 may be considered proportional to the difference of the input signals as set forth in Equation 1.

It should be understood that it is within the scope of the invention to modify the pressures, the areas, the ratio of the areas and the spring constant according to the particular use.

Referring to FIGURES 3 and 4, it should now be apparent that the shaft 55 will transmit an output signal to the rotatable element 31 of the comparing means. The rotatable element 31 will rotate an amount proportional to the actual speed of the vehicle when the input signals to the input ports 66 and 67 are equal. The rotatable element 37, which is connected to the accelerator linkage 13, receives a signal proportional to the actual speed. When the input signals are equal, the rotatable members 31 and 37 may be engaged by the bolt member 46 to rotate as a unit.

When the bolt member 46 engages the square hole 32, accelerator linkage 15 will be indirectly connected to the output shaft 65 of the automatic control means. If the speed of the automotive vehicle should decrease due to road irregularity, the input signal to port 66 would also decrease. The decrease in the input signal to port 66 would cause the force $F_a$ to decrease, thereby causing the output shaft 65 to move to the left (FIGURE 3). The movement of the output shaft 65 to the left would rotate the shaft 55, the rotatable element 31 and the rotatable element 37, which is connected to the accelerator linkage 15. The rotation of the accelerator linkage 15 by the rotatable element 37 will cause an increase of the actual speed of the automotive vehicle and consequently the input signal $P_a$ of the port 66. The increase of the input signal of port 66 would cause the output shaft 65 to move to the right and stabilize its position. In the foregoing manner, the automatic control means 9, when engaged, serves to maintain the automotive vehicle at the selected speed regardless of the grade of the road over which the automotive vehicle is traveling.

In addition to the automatic control of the automotive vehicle, the invention embodies a warning device 100 shown in FIGURES 4 and 6–9. The warning device 100 functions to cause a warning signal when the selected speed is attained by the automotive vehicle. The warning device 100 also functions to cause a signal when the automotive vehicle exceeds the speed selected in the operation of the automatic control means.

The warning device 100 includes an arm 60 (FIGURE 4) which is rigidly connected to the rotatable element 31 by the pin 56. The pin 56, as previously described, is placed in the holes 52 and 58 and in the 60° slot 59. The spring 105, as previously described, is rigidly attached to the arm 60 and the shaft 55 to cause the pin 56, the arm 60 and the rotatable element 31 to follow the shaft 55 when it is rotated in a clockwise direction (FIGURE 6).

FIGURE 6 shows the position of the parts of the warning device 100 when the automobile is at rest. When the automotive vehicle is started and begins to move, the shaft 55 is actuated by the output shaft 65 to rotate in a clockwise direction. The rotation of the shaft 55 in a clockwise direction causes the spring 105 to actuate the arm 60, the pin 56 and the rotatable element 31.

Figure 7:
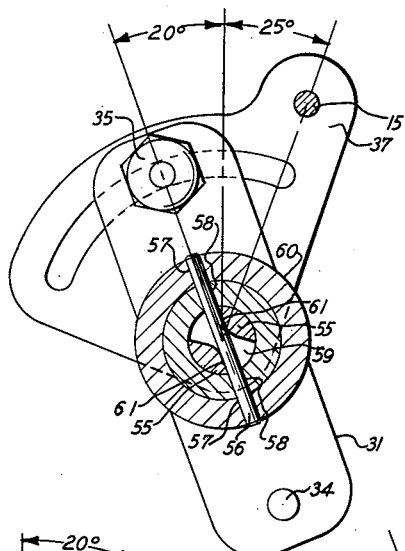

FIGURE 7 shows the position of the parts of the warning device 100 with the selection means 2 set at approximately 40 miles per hour and the automotive vehicle traveling at a slower speed. It should be noted that the rotatable element 37 has been rotated in a counterclockwise direction by the link 15 connected to the accelerator linkage and the rotatable element 31 has been rotated in a clockwise direction by the shaft 55 connected to the output shaft 65 of the automatic control means 9.

Figure 8:
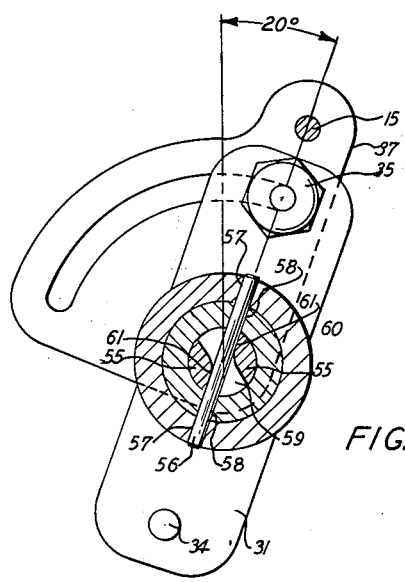

When the signal transmitted to the rotatable element 37 by the link 15 is equal to the signal transmitted to the rotatable element 31 by the shaft 55, the end of the arcuate slot 38 will abut the fastening means 35 (FIGURE 8). The abutting of the end of the radial groove 38 and the fastening means 35 will tend to transmit a signal through the accelerator linkage to the accelerator pedal. This signal will warn the operator that the selected speed has been attained.

Figure 9:
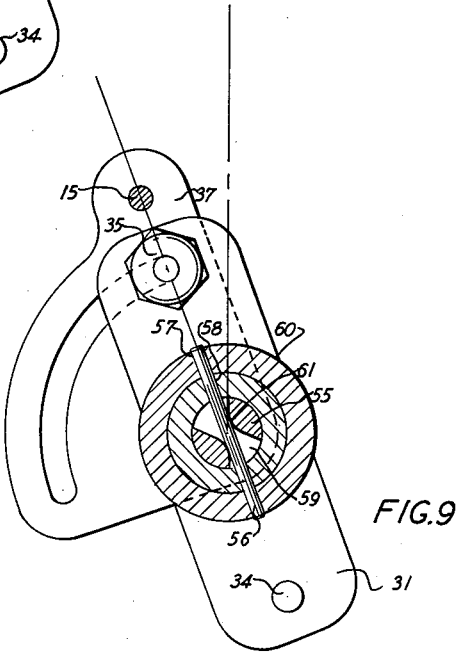
Figure 10:
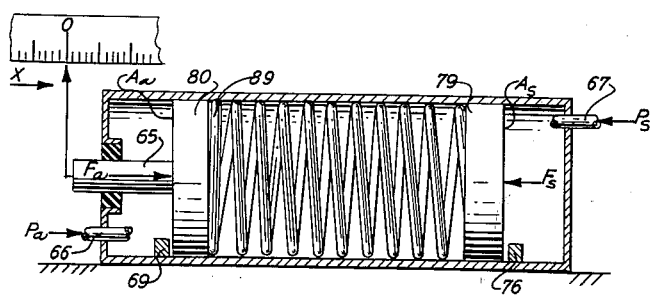

The further actuation of the link 15 by the depression of the accelerator pedal 14 will cause a warning signal to be transmitted to the operator via the accelerator pedal 14. Referring to FIGURE 9, the end of the radial slot 38 rotates the fastening means 35 and, consequently, the rotatable element 31 and the arm 60 in a counterclockwise direction. The 60° slot 59 and the spring 105 permit the rotatable element 31, the arm 60 and the pin 56 to rotate relative to the shaft 55 in a counterclockwise direction. The shaft 55 is held in a substantially fixed position by the forces exerted by the fluid in the automatic control means 9 and transmitted through the output shaft 65 and the associated linkage. Since the spring 105 is rigidly attached to the shaft 55 at one end and the arm 60 at the other end, the movement of the rotatable element 31 and the arm 60 by the depression of the accelerator pedal beyond the selected speed is resisted by the spring 105 which is held in a fixed position at one end by the shaft 55. The force exerted by the resistance of the spring 105 is transmitted through the arm 60, the rotatable element 31, the fastening means 35, the rotatable element 37 and the accelerator linkage 15 to the accelerator pedal 14, whereby the operator is warned that he is exceeding the selected speed. It should be recognized that the acceleration of the vehicle is only slightly inhibited by the warning forces caused by the spring 105.

In summary, the device hereinbefore described in detail provides a means for automatically maintaining the automotive vehicle at a selected speed, reminding the operator when the selected speed has been attained and warning the operator when the selected speed is being exceeded.

It will be understood that the invention is not to be limited to the exact construction shown and described and that various changes and modifications may be made without departing from the spirit and scope of the invention, as defined in the appended claims.

We claim:

1. A control system for a vehicle comprising: a controllable means for controlling a variable of vehicle operation by movement to various positions, said controllable means adapted to be automatically controlled; an automatic control means for adjusting said position of said controllable means, said automatic control means generating an output signal proportional to the actual value of said variable of vehicle operation being controlled, a first input means generating a first signal representative of said variable of vehicle operation being controlled by said controllable means, a second input means generating a second signal representative of a selected value of said variable of vehicle operation being controlled by said controllable means, said first and second input means operatively coupled to said automatic control means, said output signal of said automatic control means generated to oppose any deviation of said first input signal from said second input signal when said automatic control means is controlling said controllable means, a comparing means for enabling the output signal of said automatic control means to be connected to said controllable means, said comparing means operatively coupled to said controllable means and to said automatic control means; a warning means for manifesting a signal when said first signal is equal to said second signal, said warning means operatively coupled to said first input means and said second input means; and selection means for selectively engaging said controllable means to said automatic control means, said selection means operatively coupled to said automatic control means and said controllable means, whereby said controllable means may be controlled automatically by said automatic control means.

2. A control system for a vehicle comprising: a controllable means for controlling a variable of vehicle operation by movement to various positions, said controllable means adapted to be automatically controlled; an automatic control means for adjusting said position of said controllable means, said automatic control means generating an output signal proportional to the actual value of said variable of vehicle operation being controlled, a first input means generating a first signal representative of said variable of vehicle operation being controlled by said controllable means, a second input means generating a second signal representative of a selected value of said variable of vehicle operation being controlled by said controllable means, said first and second input means operatively coupled to said automatic control means, said output signal of said automatic control means generated to oppose any deviation of said first input signal from said second input signal when said automatic control means is controlling said controllable means, a comparing means for enabling the output signal of said automatic control means to be connected to said controllable means, said comparing means operatively coupled to said controllable means and to said automatic control means; a warning means for manifesting a signal when said first signal is equal to said second signal, said warning means operatively coupled to said first input means and said second input means; and selection means for selectively engaging said controllable means to said automatic control means, said selection means operatively coupled to said automatic control means and said controllable means, whereby said controllable means may be controlled automatically by said automatic control means.

3. A control system for a vehicle comprising: a controllable means for controlling a variable of vehicle operation by movement to various positions, said controllable means adapted to be automatically controlled; an automatic control means for adjusting said position of said controllable means, said automatic control means generating an output signal proportional to the actual value of said variable of vehicle operation being controlled, a first input means generating a first signal representative of said variable of vehicle operation being controlled by said controllable means, a second input means generating a second signal representative of a selected value of said variable of vehicle operation being controlled by said controllable means, said first and second input means operatively coupled to said automatic control means, said output signal of said automatic control means generated to oppose any deviation of said first input signal from said second input signal when said automatic control means is controlling said controllable means, a comparing means for enabling the output signal of said automatic control means to be connected to said controllable means, said comparing means operatively coupled to said controllable means and to said automatic control means; a warning means for manifesting a signal when said first signal is equal to said second signal, said warning means operatively coupled to said first input means and said second input means; and selection means for selectively engaging said controllable means to said automatic control means, said selection means operatively coupled to said automatic control means and to said controllable means, whereby said controllable means may be controlled automatically by said automatic control means.

4. A control system for a vehicle comprising: a controllable means for controlling a variable of vehicle operation, said controllable means adapted to be automatically controlled; an automatic control means for automatically controlling said controllable means, a plurality of fluid input means, a first of said fluid input means for generating a first input signal proportional to said variable of vehicle operation being controlled by said controllable means, a second of said fluid input means for generating a second signal proportional to a selected value of said variable of vehicle operation being controlled by said controllable means; said automatic control means comprising, a fluid chamber having a plurality of input ports, a first of said input ports being connected to said first fluid input means, a second of said input ports being connected to said second fluid input means, a resilient member disposed in said fluid chamber, two movable members disposed in said fluid chamber, each of said movable members actuated by one of said input signals and exerting a force upon said resilient member, and an output means for manifesting an output signal, said output signal of said output means opposing any change of said first input signal when said output means is engaging said controllable means; a comparing means for enabling said output means of said automatic control means to engage said controllable means for automatic control, said comparing means operatively coupled to said controllable means and said automatic control means; and selection means for selectively engaging said controllable means to said automatic control means, said selection means operatively coupled to said automatic control means and said controllable means, whereby said controllable means may be controlled automatically.

5. A control system for a vehicle comprising: a controllable means for controlling a variable of vehicle operation, said controllable means adapted to be automatically controlled; an automatic control means for automatically controlling said controllable means; a plurality of fluid input means, a first of said fluid input means for generating a first input signal proportional to said variable of vehicle operation being controlled by said controllable means, a second of said fluid input means for generating a second signal proportional to a selected value of said variable of vehicle operation being controlled by said controllable means; said automatic control means comprising, a fluid chamber having a plurality of input ports, a first of said input ports being connected to said first fluid input means, a second of said input ports being connected to said second input means, a resilient member disposed in said fluid chamber, two movable members disposed in said fluid chamber, each of said movable members being actuated by one of said input signals and each of said movable members exerting a force upon said resilient member, and an output means for producing an output signal connected to said resilient member, said output signal of said output means opposing any change of said first input signal when said output means is engaging said controllable means; a comparing means for enabling said output means of said automatic control means to engage said controllable means, said comparing means comprising two movable elements, each of said movable elements having connectable means for selectively connecting said movable elements, one of said movable elements connected to be moved by said output means of said automatic control means and the other of said movable means connected to be moved by said controllable element; and selection means for connecting said connectable means of said movable elements, said selection means operatively connected to said connectable means, whereby said controllable means may be controlled automatically by said automatic control means.

6. A control system for a vehicle comprising: a controllable means for controlling a variable of vehicle operation, said controllable means adapted to be automatically controlled; an automatic control means for controlling said controllable means; a plurality of fluid input means, a first of said fluid input means generating a first input signal proportional to said variable of vehicle operation being controlled by said controllable means, a second of said fluid input means generating a second signal proportional to a selected value of said variable of vehicle operation being controlled by said controllable means; said automatic control means comprising, a fluid chamber having a plurality of input ports, a first of said input ports being connected to said first fluid input means, a second of said input ports connected to said second fluid input means, a resilient member disposed in said fluid chamber, a plurality of movable members disposed in said fluid chamber, each of said movable members actuated by one of said input signals and each of said movable members exerting a force upon said resilient member, and an output means for manifesting an output signal, said output means connected to one of said movable members, said output signal of said output means opposing any change of said first input signal when said output means is engaging said controllable means; a comparing means for enabling said output means of said automatic control means to engage said controllable means, said comparing means comprising, two rotatable elements, one of said rotatable elements having a female connection and the other of said rotatable element having a male connection, one of said rotatable elements connected to be rotated by said output means and the other of said rotatable elements connected to be rotated by said controllable means, one of said rotatable elements being adapted to be moved so that said male and female connections can be engaged; and selection means for selectively moving said rotatable elements of said comparing means into engagement, said selection means operatively coupled to said rotatable elements, whereby said controllable means may be controlled automatically by said automatic control means.

7. An automotive vehicle having the combination comprising: an accelerator linkage, said accelerator linkage adapted to be automatically controlled; an automatic control means for controlling said accelerator linkage; a plurality of input means, one of said input means generating a first signal proportional to the actual speed of the automotive vehicle, another of said plurality of input means generating a second signal proportional to a selected speed of the automotive vehicle; said automatic control means generating an output signal proportional to the actual speed of the automotive vehicle, said output signal of said automatic control means generated to oppose any change of said first input signal when said automatic control means is engaging said accelerator linkage, said automatic control means operatively coupled to said input means; a comparing means for comparing the position of said accelerator linkage with the output signal of said automatic control means, said comparing means enabling said output signal of said automatic control means to be operatively coupled to said accelerator linkage when said position and signal being compared are equal, said comparing means operatively coupled to said accelerator linkage and to said automatic control means; and selecting means for selectively engaging said accelerator linkage to said automatic control means, said selecting means operatively coupled to said automatic control means and said accelerator linkage, whereby said accelerator linkage may be controlled automatically.

8. An automotive vehicle having the combination comprising: an accelerator linkage, said accelerator linkage adapted to be engaged for automatic control; an automatic control means for controlling said accelerator linkage; a plurality of input means, one of said input means generating a first signal proportional to the actual speed of the automotive vehicle, another of said plurality of input means generating a second signal proportional to a selected speed of the automotive vehicle; said automatic control means generating an output signal proportional to the actual speed of the automotive vehicle, said output signal of said automatic control means generated to oppose any change of said first input signal when said automatic control means is engaging said accelerator linkage, said automatic control means operatively coupled to said input means; a comparing means for comparing the position of said accelerator linkage with the output signal of said automatic control means, said comparing means enabling said output signal of said automatic control means to be operatively coupled to said accelerator linkage when said position and signal being compared are equal, said comparing means operatively coupled to said accelerator linkage and to said automatic control means; selecting means for selectively engaging said accelerator linkage to said automatic control means, said selecting means operatively coupled to said automatic control means and said accelerator linkage, whereby said accelerator linkage may be controlled automatically when said comparing means has enabled said automatic control means to be engaged by said accelerator linkage and the selecting means has been operated so that said automatic control means is engaging said accelerator pedal; and a warning means for manifesting a signal when the actuation of said accelerator linkage is equal to the selected value of actuation of said accelerator linkage, said warning means operatively coupled to said accelerator linkage and said automatic control means, said warning means connected to said accelerator linkage so that the signal manifested by said warning means is transmitted to said accelerator linkage.

9. In a system to be controlled having a controllable element for controlling a variable and a plurality of input means, one of said input means for generating an input which represents the actual value of said variable and another of said input means for generating an input which represents a selected value of said variable, the combination comprising: an automatic control means for automatically controlling said controllable element, said automatic control means generating an output signal proportional to said actual value of said variable when said inputs representing said selected value of said variable and said actual value of said variable are equal, said output signal of said automatic control means opposing any change of said inputs representing said variables when said automatic control means is engaged to said controllable element being controlled, said automatic control means being adapted to receive said inputs, said automatic control means being selectively engageable to said controllable element being controlled, and a means for selectively engaging said automatic control means to said controllable element, said means operatively coupled to said automatic control means and said controllable element.

10. In a system to be controlled having a plurality of fluid input means wherein one of said fluid input means generates a signal representative of the actual value of said variable and another of said fluid input means generates an input representative of a selected value of said variable, the combination comprising: an automatic control means for controlling said actual value of said variable, said automatic control means comprising, a fluid chamber having a plurality of input ports, said input ports being operatively coupled to said fluid input means, a resilient member disposed in said fluid chamber, two movable members disposed in said fluid chamber, each of said movable members actuated by one of said fluid input signals and each of said movable members exerting a force upon said resilient member, and an output means connected to one of said movable members for manifesting an output signal, said output means adapted to be selectively engaged to said system being controlled, said output signal adapted to oppose any change of said fluid input signals when said output means is engaging said system being controlled.

11. A control system for a vehicle comprising: a controllable means for controlling a variable of vehicle operation, said controllable means adapted to be automatically controlled; an automatic control means for controlling said controllable means; a plurality of fluid input means, one of said input means generating a first input signal proportional to said variable of vehicle operation being controlled by said controllable means, another of said plurality of fluid input means generating a second signal proportional to a selected value of said variable of vehicle operation being controlled by said controllable means; said automatic control means comprising, a fluid chamber having a plurality of input ports, said input ports being operatively coupled to said fluid input means, a resilient member disposed in said fluid chamber, a plurality of movable members disposed in said fluid chamber, each of said movable members being actuated by one of said input signals and each of said movable members exerting a force upon said resilient member, and an output means connected to one of said movable members to cause an output signal, said output signal opposing any change of said first input signal when said output means is engaging said controllable means; a comparing means for enabling said output means of said automatic control means to engage said controllable means, said comparing means comprising, two rotatable elements, one of said rotatable elements connected to be rotated by said output means and the other of said rotatable elements connected to be rotated by said controllable means, one of said rotatable elements movable into engagement with the other of said rotatable elements; one of said rotatable elements having a female connection and the other of said rotatable elements having a male connection, said connections being of such a configuration that said rotatable elements can only be connected when said output means and said controllable means cause an equal angular displacement from a fixed reference; and selecting means for selectively moving said rotatable elements of said comparing means into engagement, said selecting means operatively coupled to said rotatable elements, whereby said controllable means may be controlled automatically when said rotatable elements of said comparing means are in an engageable rotational relationship and the selecting means has been operated so that said rotatable elements are moved into engagement; and a warning means for manifesting a signal when said first signal is equal to said second signal, said warning means operatively coupled to said input means.

References Cited in the file of this patent
UNITED STATES PATENTS
2,036,619     Brown et al. _____ Apr. 7, 1936